Figure 1:
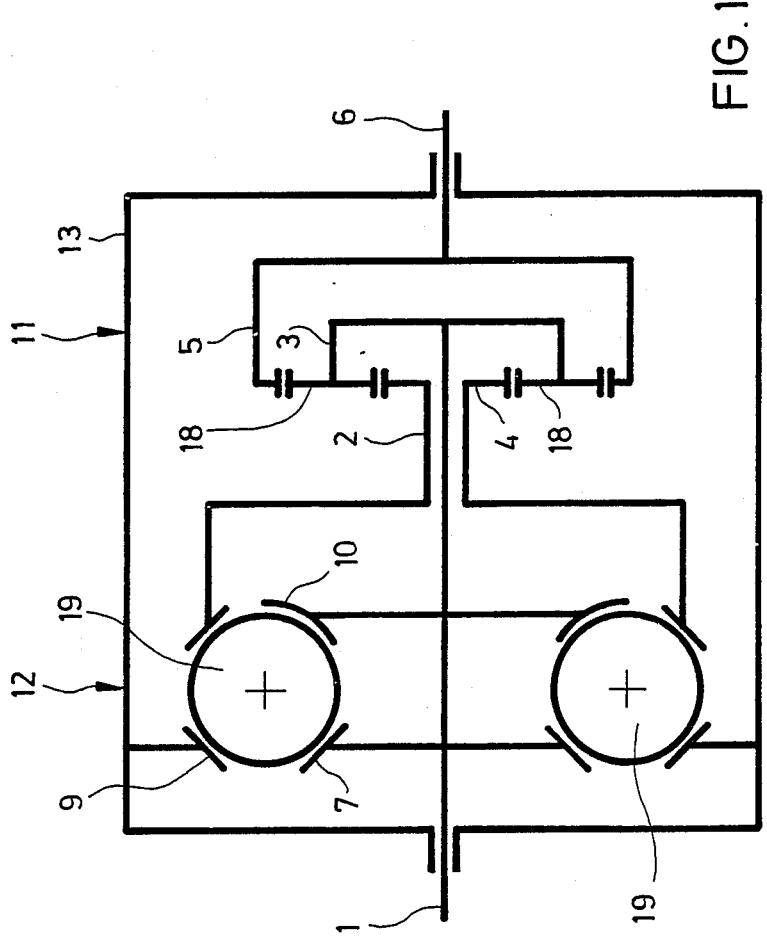

United States Patent [19]

Kreuzer

[11] Patent Number: 4,856,374
[45] Date of Patent: Aug. 15, 1989

[54] ADJUSTABLE TRANSMISSION

[75] Inventor: Hubert Kreuzer, Munderkingen, Fed. Rep. of Germany

[73] Assignee: planetroll Antriebe GmbH, Munderkingen, Fed. Rep. of Germany

[21] Appl. No.: 160,763

[22] Filed: Feb. 26, 1988

[30] Foreign Application Priority Data

Mar. 2, 1987 [DE] Fed. Rep. of Germany ....... 3706716

[51] Int. Cl.$^4$ .............................................. F16H 37/02
[52] U.S. Cl. ....................................... 74/740; 74/190; 74/796; 384/536
[58] Field of Search .................. 74/190, 208, 690, 691, 74/796, 740; 384/536, 557, 905

[56] References Cited

U.S. PATENT DOCUMENTS

| 2,803,507 | 8/1957 | Mempel et al. | 384/536 |
| 3,420,122 | 1/1969 | Okabe | 74/190 X |
| 3,504,574 | 4/1970 | Okabe | 74/796 |
| 4,089,569 | 5/1978 | Rempel | 384/536 |
| 4,424,726 | 1/1984 | Galbraith | 74/796 |
| 4,489,992 | 12/1984 | Brandenstein et al. | 384/536 X |
| 4,592,247 | 6/1986 | Mutschler | 74/796 X |
| 4,593,574 | 6/1986 | Sinn et al. | 74/796 X |
| 4,667,525 | 5/1987 | Schottler | 74/796 X |
| 4,693,134 | 9/1987 | Kraus | 74/796 X |
| 4,718,781 | 1/1988 | Gérard | 384/536 X |

Primary Examiner—Dwight G. Diehl
Attorney, Agent, or Firm—Finnegan, Henderson, Farabow, Garrett & Dunner

[57] ABSTRACT

In known combinations of a planetary gear transmission with a continuously variable friction drive transmission, unsatisfactory accuracy in operation and excessive overall dimensions are found to be disadvantageous.

The transmission according to the invention comprises a planetary gear transmission (11) operatively connected to a continuously variable friction drive transmission (12) with spherical rolling members (19).

The transmission according to the invention is finely or infinitesimally adjustable over a wide range of positive or negative transmission ratios and particularly suitable for employ in a closed control system.

8 Claims, 3 Drawing Sheets

ADJUSTABLE TRANSMISSION

The invention relates to a transmission comprising a planetary gear having an input shaft and an output shaft.

Known planetary gear transmissions are designed to be used at a number of positive and negative transmission ratios, the relationship of the variation of the rotary speed in the different modes being determined by the construction of the transmission. The positive or negative transmission ratio is varied by stopping one of the rotatable components of the planetary gear. This is usually accomplished by means of a mechanical locking brake. A planetary gear transmission of this type is thus operable at pre-established positive and/or negative transmission ratios.

It is also known to combine a planetary gear transmission with a continuously variable drive transmission in such a manner that the output component of the continuously variable drive transmission is operatively connected to the component of the gear transmission to be braked or stopped. To this purpose use has been made of continuously variable friction drive transmissions comprising axially displaceable conical disk pairs surrounded by a laminated chain. It is also known to design continuously variable friction drive transmissions in the form of a variable steel ring drive transmission. These known transmission combinations suffer from the disadvantage that the combination as a whole is extremely bulky, because the continuously variable friction drive transmissions thus employed require a second shaft extending parallel to the input shaft and acting as the output component of the continuously variable friction drive transmission. The spacing between the two shafts of the friction drive transmission is dependent on the required range of rotary speed variation. A further disadvantage of known transmission combinations of this type results from the fact that continuously variable friction drive transmissions of the type described above including the mentioned conical disk arrangement are not capable of being finely or infinitesimally adjusted at will, because wear of the conical disks and the laminated chain surrounding them, or wear of the steel ring, respectively, may result in deviations of the rotary speed. The employ of continuously variable friction drive transmissions of this type involves the further disadvantage that such friction drive transmissions are sensitive to temperature variations, i.e. heating of the transmission during operation may result in undesirable changes of the positive or negative transmission ratio. A further disadvantage of this type of a known transmission arrangement according to prior art is due to the fact that its variation characteristic as a whole is of exponential nature. This appears particularly inexpedient when employing a transmission of this type in a closed control system, because due to the exponential character of the continuously variable friction drive transmission, the servo motor employed for controlling the transmission rate of the friction drive transmission has to be energized by pulses of varying duration. This results in an excessively complicated structure of the control circuit. The employ of transmission arrangements of this type may result in the further disadvantage that the rotary output speed of the continuously variable friction drive transmission does not accurately correspond to the rotary speed to be imposed on the respective member of the planetary gear. In these cases it is necessary to provide additional intermediate transmissions, resulting in an increase of the cost for the transmission arrangement as a whole and of its overall dimensions, and in further shortcomings with regard to the required accuracy of the transmission arrangement.

It is therefore an object of the invention to provide a transmission of the type defined in the introduction, which is of simple construction and reliable in operation while being finely or infinitesimally adjustable and having the smallest possible overall dimensions.

In accordance with the invention, this object is attained by the provision that the input shaft is in addition operatively connected to an input component of a continuously variable friction drive transmission including spherical rolling members, and that an output component of said friction drive transmission is operatively connected to one of the rotatable components of the planetary gear not connected to the input shaft or to the output shaft.

The transmission according to the invention offers a number of considerable advantages. The combination of a planetary gear with a continuously variable friction drive transmission having spherical rolling members as known for instance from US Pat. No. 37 07 888 and DE No. 26 58 791, permits a finely or infinitesimally adjustable rotary speed to be imposed on the respective component to be braked of the planetary gear. This fine or infinitesimal adjustability is achieved in an excellent manner by the provision that the continuously variable friction drive transmission includes spherical rolling members operatively disposed between an input component and an output component so that their contact points with the input component or the output component, respectively, are finely adjustable as required. Since the adjustability of a friction drive transmission is linear, the transmission according to the invention is particularly suitable for employ in a closed control system because the servo motor for the adjustment of the friction drive transmission can be energized with pulses of uniform duration for obtaining rotary speed variations of the same magnitude in the friction drive transmission.

A further substantial advantage of the transmission according to the invention results from the provision that both the planetary gear and the continuously variable friction drive transmission have coaxially aligned input and output shafts, respectively. The provision of additional parallel shafts is therefore not required. This results in a considerable reduction of the overall dimensions of the transmission, permitting the transmission to be employed for applications where conventional transmissions could formerly not be used due to their dimensions.

A further advantage of the transmission according to the invention is to be seen in the fact that it is capable of achieving a transmission ration of up to 1:75, whereas conventional transmission were generally capable of achieving transmission reatios of only 1:4 to 1:9.

In a particularly advantageous embodiment of the transmission according to the invention, the continuously variable friction drive transmission includes components for determining the rotary speed variation, these components being axially adjustable relative to one another and supported by a housing, optionally by the intermediary of intermediate members. According to a further aspect of the invention, adjacent one or both axial ends of the housing of the friction drive transmission there is disposed a plastic ring tightly embraced on three sides by the housing, the components determining the rotary speed variation being axially supported on the free end surface(s) of said plastic ring(s), optionally through the intermediate members, the temperature expansion coefficient of said plastic ring being several times greater than that of the housing material. This arrangement ensures that heating of the transmission during operation will not result in an alteration of the finely or infinitesimally adjusted rotary speed ratio due to uncontrolled expansion of certain portions of the transmission, so that an increase in temperature will not result in a maladjustment of the continuously variable friction drive transmission.

In an advantageous construction, the input shaft of the transmission may be connected either to the sun gear or to the planet carrier, while the output component of the friction drive transmission may be connected to the sun gear or the outer gear, respectively, of the planetary gear. These different options of the construction permit the transmission to be adapted to any desired applications in a simple manner.

According to another advantageous aspect of the invention, the input shaft and the output shaft are mounted in coaxial relationship with one another. This results in a particularly compact construction of the transmission, permitting it to be installed in already existing machinery or similar equipment without requiring expensive modifications thereof. In this context it is particularly advantageous that the output shaft is in the form of a hollow shaft surrounding the input shaft. This construction permits both the radial and axial dimensions of the transmission to be minimized in a particularly simple manner.

The transmission according to the invention may advantageously comprise a planetary gear in the form of a trochoid drive transmission or a differential gear transmission.

The transmission according to the invention may advantageously be employed for print mark control applications in four-colour printing. This is because in such an application the advancing speed of the paper web has to be accurately synchronized with the rotary speed of the various printing cylinders in order to accurately superimpose the individual colour patterns upon one another. A further possible application is in the processing of plastic sheet materials, in which case the stretching ratio of the sheets has to be controlled with the highest precision, to which purpose the rotary speed of the components for advancing the sheet material has to be accurately controlled.

The transmission according to the invention has been found particularly advantageous for amongst others the above mentioned applications, because the occurrence of load variations will only result in very slight rotary speed variations, if any, without requiring readjustment of the transmission. This is in particular due to the fact that only a small portion of the load transmitted through the transmission is transmitted to the continuously variable friction drive transmission with its spherical rolling members, the major part of the forces being directly applied to the planetary gear. As a result of the reduced load acting on the friction drive transmission, the speed transmission ratio to which this transmission has been adjusted can be maintained substantially constant.

Figure 2:
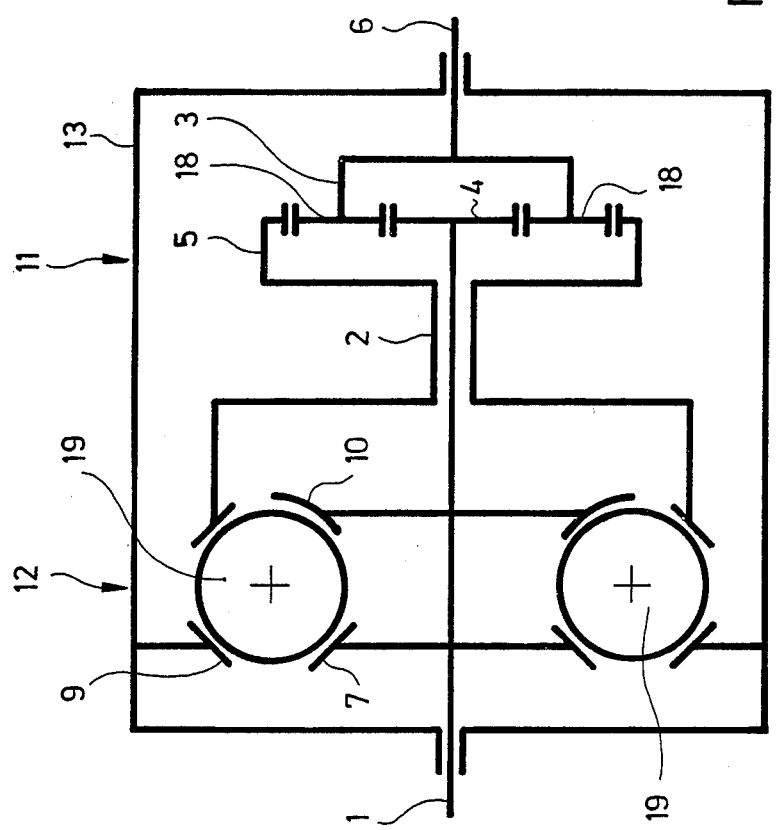
Figure 4:
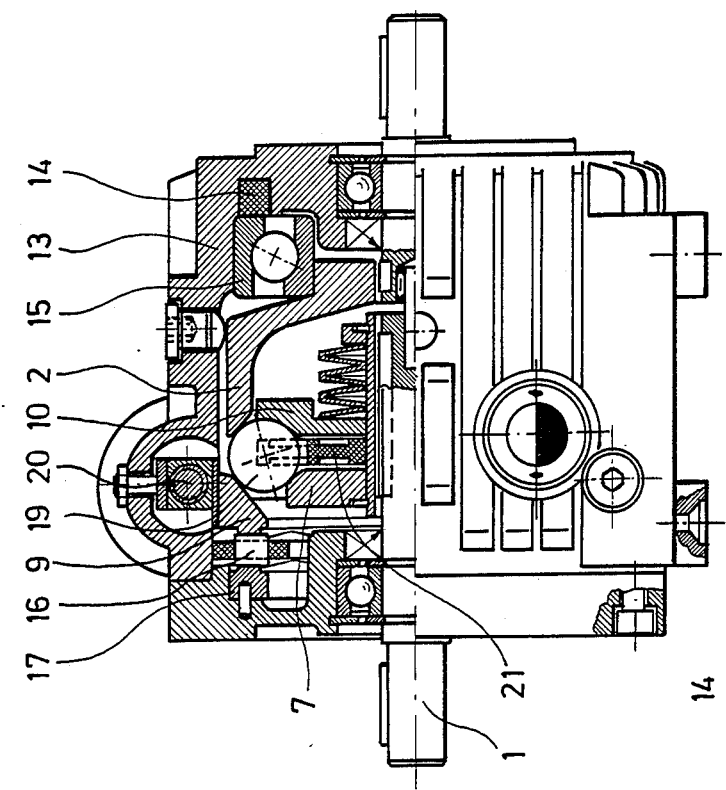
Figure 5:
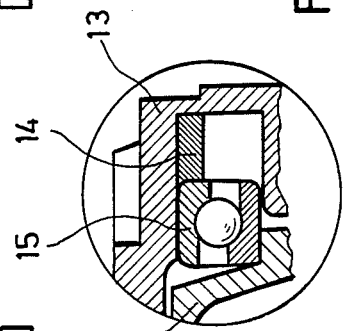
Figure 3:
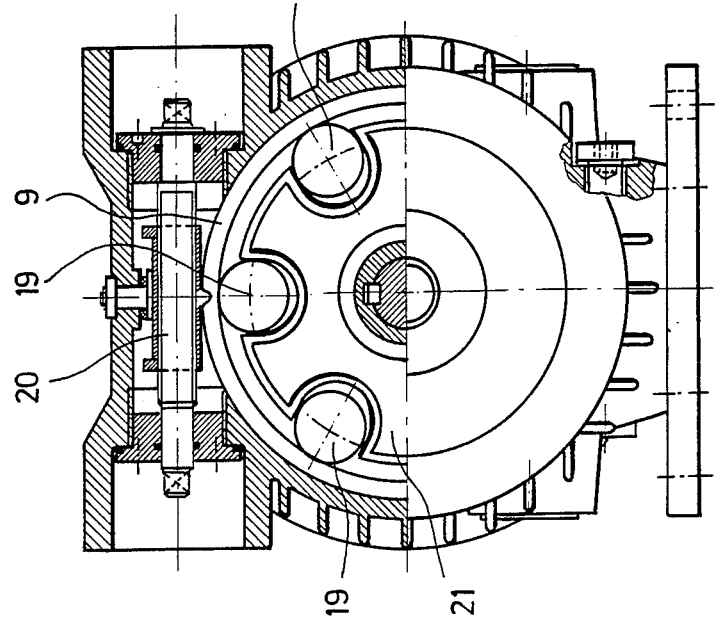

Embodiments of the invention shall now be described by way of example with reference to the accompanying drawings, wherein:

FIG. 1 shows a diagrammatic illustration of a transmission according to a first embodiment of the invention, FIG. 2 shows a diagrammatic illustration similar to FIG. 1 of a second embodiment, FIG. 3 shows a partially sectioned end view of a continuously variable friction drive transmission, FIG. 4 shows a partially sectioned sideview of the transmission of FIG. 3, and FIG. 5 shows an enlarged detail view of a bearing assembly in the transmission of FIG. 4.

The transmission shown in FIG. 1 has an input shaft 1 rotatably mounted in a housing 13. An input component 7 of a continuously variable friction drive trnasmission 12 provided with spherical rolling members 19 is non-rotatably connected to input shaft 1. Spherical rolling members 19 are rotatably supported between a surface (not shown in detail) of input component 7, an axially displaceable adjustment ring 9 mounted in housing 13, a biasing ring 10, and an output component 2. Biasing ring 10 is non-rotatably mounted on input shaft 1 for axial displacement therealong. Output component 2 is rotatably mounted in housing 13. In the embodiment shown in FIG. 1, input shaft 1 is additionally connected to a planet carrier 3 of a planetary gear 11. Mounted on planet carrier 3 is a plurality of planet gears 18 meshing with a sun gear 4 connected to output component 2, and with an internally toothed outer gear 5, the latter being connected to an output shaft 6. The drive torque of input shaft 1 is thus transmitted to both input component 7 and planet carrier 3. The rotary output speed of friction drive transmission 12 is transmitted from output component 2 to sun gear 4 to thereby control the rotary speed of output shaft 6. As will be explained in detail with reference to FIGS. 3 and 4, the transmission ratio of friction drive transmission 12 is altered by axial displacement of adjustment ring 9, causing the contact point of spherical rolling members 19 with the active surfaces of input components 7 and/or output component 2 to be radially displaced.

The embodiment diagrammatically shwon in FIG. 2 is substantially similar to the embodiment of FIG. 1, corresponding components being designated by the same reference numerals. This embodiment differs from the one shown in FIG. 1 by the provision that input shaft 1 is connected to sun gear 4, while output component 2 of friction drive transmission 12 is operatively connected to outer gear 5. From this results that output shaft 6 is non-rotatably connected to planet carrier 3.

FIG. 3 shows a partially sectioned end view of the lefthand end portion of friction drive transmission 12 as shown in FIGS. 1 and 2. Spherical rolling memebers 19 are guided in a cage 21 in a manner permitting their radial displacement. Adjustment ring 9 is axially displaceable by means of an adjustment actuator 20 which may be in the form of a threaded spindle or in the form of a hydraulic or pneumatic piston actuator. It is also possible to provide a step motor or a linear motor as the axial adjustment actuator. The active surface of adjustment ring 9 cooperating with spherical rolling members 19 has a ramp configuration (not shown), so that an angular displacement of adjustment ring 9 by means of axial adjustment actuator 20 causes spherical rolling members 19 to be axially displaced.

FIG. 4 shows a partially sectioned sideview of the friction drive transmission of FIG. 3 illustrating the operative relationship of adjustment ring 9, input component 7, output component 2, and biasing ring 10 with respect to spherical rolling members 19. Biasing ring 10 is non-rotatably connected to input shaft 1 and biased into engagement with spherical rolling members 19 by a spring stack or by means of a mechanical biasing force regulator. Output component 2 is mounted in housing 13 by a bearing 15. Disposed at an axial position between the outer ring of bearing 15 and housing 13 is a plastic ring 14 of amterial selected to have a substantially greater thermal expansion coefficient than the material of housing 13, so that the thermal expansion of output component 2, adjustment ring 9, bearing 15, support rollers 16 and thrust ring 17 is compensated with respect to the thermal expansion of housing 13. In this manner it is ensured that temperature variations during operation of the transmission will not cause a shifting of the contact points between spherical rolling members 19 on the one hand and input component 7 and/or output component 2 on the other. Adjustment ring 9 is supported in housing 13 by support rollers 16 and thrust ring 17.

FIG. 5 shows a modified embodiment of the arrangement of plastic ring 14 disposed between housing 13 and the outer race of bearing 15 and in engagement therewith.

The operative relationship of the input and output shafts and other components with respect to one another as described with reference to the embodiments shown is not to be understood in a restrictive sense, it being also possible within the purview of the invention, to employ output shaft 6 as the input shaft, and input shaft 1 as the output shaft. The transmission according to the invention is also suitable for transmitting rotation in different directions.

I claim:

1. A transmission comprising:
   an input shaft;
   an ouput shaft;
   a continuously variable friction drive trnasmission (12) including an input component (7), an output component (2) and spherical rolling members (19), with said input shaft (1) being operatively connected for transmitting torque to both said planet carrier (3) and said input component (7), and said output component (2) being oepatively connected to said sun gear (4) and said outer gear (5) being operatively connected to said output shaft (6).

2. A transmission according to claim 1, characterized in that said continuously variable friction drive transmission (12) comprises components (2, 7-10, 19) for determining the rotary speed variation, said components being axially adjustable relative to one another and supported by a housing.

3. A transmission according to claim 2, characterized in that adjacent at least one end of said housing (13) of said friction drive transmission (12) there is disposed a plastic ring (14) tightly embraced on three sides by said housing, said components (2, 7-10, 19) determining the rotary speed variation being axially supported on a free end surface of said plastic ring through intermediate members (15, 16, 17), the temperature expansion coefficient of said plastic ring (14) being several times greater than that of material from which the housing is constructed.

4. A transmission according to claim 3, characterized in that said plastic ring (14) and a groove receiving it have a slightly conical cross-sectional shape diverging towards a free side of the ring.

5. A transmission according to claim 1, characterized in that said input shaft (1) and said output shaft (6) are coaxially aligned with one another.

6. A transmission according to claim 1, characterized in that said output shaft (6) is formed as a hollow shaft surrounding said input shaft (1).

7. A transmission according to claim 1, characterized in that said planetary gear (11) is configured in the form of a trochoid drive transmission.

8. A transmission according to claim 1, characterized in that said planetary gear (11) is configured in the form of a differential gear transmission.

* * * * *

UNITED STATES PATENT AND TRADEMARK OFFICE
CERTIFICATE OF CORRECTION

PATENT NO. : 4,856,374

DATED : August 15, 1989

INVENTOR(S) : Hubert Kreuzer

It is certified that error appears in the above-identified patent and that said Letters Patent is hereby corrected as shown below:

Claim 1, column 5, line 35, after "shaft" insert --(1)--;

Claim 1, column 5, line 36, after "shaft" insert --(6)--;

Claim 1, col. 5, after line 37 and before line 38, insert:

--a planet gear (11) having a sun gear (4), a planet carrier (3) having mounted thereon a plurality of planet gears (18), and an outer gear (5) with said planet gears (18) meshing with said sun gear (4) and said outer gear (5),--;

Claim 1, col. 5, line 38, change "trnasmission" to --transmission--.

Signed and Sealed this

Fourth Day of September, 1990

Attest:

HARRY F. MANBECK, JR.

*Attesting Officer*  *Commissioner of Patents and Trademarks*